United States Patent [19]

Dolgoplosk et al.

[11] 3,723,400
[45] Mar. 27, 1973

[54] METHOD OF PRODUCING 1,4-CIS-POLYBUTADIENE AND CIS-COPOLYMERS OF BUTADIENE

[76] Inventors: Boris Alexandrovich Dolgoplosk, Vystavochny pereulok, 3, kv. 36; Elena Ivanovna Tinyakova, ulitsa Krasikova, 19, kv. 104; Solomon Isaakovich Beilin, proezd Shokalskogo, 39, kv. 43; Kirill Lvovich Makovetsky, ulitsa Dybenko, 38, kv. 8; Galina Moiseevna Chernenko, ulitsa Alabyana, 3, kv. 330; Irina Yakovlevna Ostrovskaya, prospekt Mira, 72, kv. 2, all of Moscow; Izmail Vladimirovich Garmonov, ulitsa Saltykova-Schedrina, 20, kv. 18, Leningrad; Boris Vasilievich Mamontov, Narvsky prospekt, 8, kv. 11, Leningrad; Alexandra Kon, Budapeshtskaya ulitsa, 23, korpus 2, kv. 151, Leningrad, all of U.S.S.R.

[22] Filed: Dec. 30, 1970

[21] Appl. No.: 102,912

[30] Foreign Application Priority Data

Dec. 31, 1969 U.S.S.R. ........................... 1391000
Dec. 31, 1969 U.S.S.R. ........................... 1392358

[52] U.S. Cl. ............... 260/82.1, 260/84.1, 260/94.3, 260/94.9 D

[51] Int. Cl. ........C08d 1/30, C08f 19/04, C08d 3/06
[58] Field of Search..........260/94.3, 84.1, 82.1, 82.5, 260/94.9 D

[56] References Cited

UNITED STATES PATENTS

| | | | |
|---|---|---|---|
| 2,965,628 | 12/1960 | Tsutsumi | 260/94.9 |
| 3,178,403 | 4/1965 | Ueda et al. | 260/94.3 |
| 3,238,146 | 3/1966 | Hewitt et al. | 252/441 |

*Primary Examiner*—James A. Seidleck
*Assistant Examiner*—William F. Hamrock
*Attorney*—Holman & Stern

[57] ABSTRACT

A method of producing 1,4-cis-polybutadiene and cis-copolymers of butadiene with conjugated cyclic dienes having a number of carbon atoms of 5 to 6 or with vinyl-aromatic compounds which involves homopolymerization or copolymerization of the butadiene with monomers. The process is effected in mass or in a medium of an inert hydrocarbon solvent in the presence of a catalyst consisting of nickel or cobalt halide applied onto an inorganic carrier having electron acceptor characteristics and subjected to thermal activation at a temperature of 150°–350°C and under a vacuum of $10^{-3}$ to $10^{-1}$ mm Hg.

8 Claims, No Drawings

METHOD OF PRODUCING 1,4-CIS-POLYBUTADIENE AND CIS-COPOLYMERS OF BUTADIENE

The present invention relates to the field of producing polymers based on butadiene and, more particularly, to a method of producing 1,4-cis-polybutadiene and cis-copolymers of butadiene with conjugated cyclic dienes or vinyl-aromatic compounds.

1,4-cis-polybutadiene is a general-purpose rubber widely used in tire industry, technical rubber industry, etc. The properties of 1,4-cis-polybutadiene approach those of natural rubber, but the former has better elasticity and frost resistance. Cis-copolymers of butadiene with the above-said monomers are very promising general-purpose rubbers.

Known in the art are methods of producing 1,4-cis-polybutadiene by means of polymerization of butadiene in a mass or in a medium of an inert solvent in the presence of catalysts consisting of salts of a number of transition metals (titanium iodide, cobalt chloride, nickel salts and aluminum organic compounds which methods have been carried into effect in an industrial scale in a number of countries (cf. FRG Pat. No.1,253,918, class 39c, 25/05). These methods are disadvantageous in the necessity of using fire- and explosion-hazardous aluminum organic compounds which impose higher requirements on the technological equipment of the process. The catalyst systems based on titanium and cobalt compounds are also disadvantageous in that minor amounts of the catalysts remaining in the polymer cause its secondary transformations in the process of treatment and during operation, thus impairing the quality of the polymer.

Known in the art is a method of producing 1,4-cis-polybutadiene by polymerizing butadiene under the action of complexes of $\pi$ allylic compounds of nickel with electron acceptors (cf. U.S. Pat. No. 3,468,866). This method is disadvantageous in the use of highly toxic and fire-hazardous compounds for producing a catalyst (nickel carbonyl, haloquinones, etc.).

Also known in the art is a method of producing 1,4-cis-polybutadiene by polymerizing butadiene in mass or in a medium of an inert hydrocarbon solvent based on catalysts such as cobaltous or nickelous halides without an addition of metallorganic compounds. The above-said catalysts are activated either by means of a preliminary heat treatment at a temperature of 250°C and under a vacuum of $10^{-5}$ mm Hg or due to the action of ultraviolet radiation in the presence of a monomer (cf. Canadian Pat. No.624,490; W.S.Anderson, J.Polym. Sci, A-1, 5, 409, 1967).

The above-mentioned method is not suitable for industrial use due to the stringent conditions of activation of the catalyst (vacuum of $10^{-5}$ mm Hg), a low activity of the catalysts obtained under these conditions, formation of a considerable amount of gel-like substance during the polymerization of butadiene (more than 50 percent of gel) and a comparatively low molecular weight of the soluble portion of the polymer.

Also known in the art is a method of producing cis-copolymers of butadiene by copolymerization of butadiene with cyclic dienes having a number of carbon atoms of 5 to 6 or with vinyl-aromatic compounds in mass or in a medium of an inert hydrocarbon solvent on systems of $\pi$-allylic type (cf. FRG Application No. p 20387217 of Aug. 4, 1970; British Application No.38107 of Aug. 7, 1970; French Application No.7030081 of Aug. 14, 1970; Canada Application No.090167 of Aug. 6, 1970; Dutch Application No.7012281 of Aug. 19, 1970).

An object of the present invention is to provide a highly efficient method of producing soluble polybutadiene having a high molecular weight and a high content of 1,4-cis-links.

Another object of the invention is to provide a method allowing one to obtain copolymers of butadiene with conjugated cyclic dienes having a number of carbon atoms from five to six, characterized by a high molecular weight and a high content of 1,4-cis-links in the butadiene portion of the chain.

Still another object of the invention is to provide a method of polymerization and copolymerization of butadiene which does not require application of toxic, fire- and explosion-hazardous components in the stage of preparation of the catalyst.

Yet another object of the invention is to develop a method of producing the above-said polymers and copolymers allowing utilization of available and inexpensive catalysts.

According to these and other objects, the invention concerns the production of 1,4-cis-polybutadiene cis-copolymers of butadiene with conjugated cyclic dienes and having a number of carbon atoms from five to six or with vinylaromatic compounds through polymerization of butadiene or copolymerization of butadiene with said monomers in mass or in a medium of an inert hydrocarbon solvent in the presence of thermally activated nickel or cobalt halides. In the latter case, according to the invention, prior to the thermal activation, the above halides are applied onto inorganic carriers featuring electron acceptor properties, while the activation is effected at a temperature of 150°-350°C and a vacuum of $10^{-3}$ to $10^{-1}$ mm Hg.

The nickel and cobalt halides are preferably applied onto the carriers in such a quantity that their content in the catalyst is equal to 0.01 to 0.2 gram per gram of the carrier.

The inorganic carriers are preferably composed of aluminum oxide, silica gel or aluminosilicate, the latter being most advantageous.

It is expedient to carry out the thermal activation of the catalyst at a temperature of 250°-300°C and under a vacuum of $10^{-3}$ to $10^{-1}$ mm Hg.

As mentioned above, in order to obtain an active catalyst, according to the proposed method, a metal halide applied onto a carrier is heated under a vacuum. Under such a treatment, surface sub-halides of metal are formed due to the dehalogenation which initiates the process of polymerization. The electron acceptor carrier reducing the electronic density on the reaction center, thus facilitating the coordination of the monomer molecules, plays an important part in the process of initiating the polymerization by the metal sub-halides. To obtain a maximum amount of active centers, it is necessary to insure a definite relationship between the duration and temperature of the heating and the value of vacuum. According to the invention, the heating temperature is within the range of 150° to 350°C and the vacuum is within the range of $10^{-3}$ to $10^{-1}$ mm Hg. The optimum activity of the catalyst based on nickel chloride under a vacuum of $10^{-2}$ mm Hg was obtained by heating at 250°C for 2 hours. For a catalyst based on nickel fluoride the optimum activity was observed by heating at 300°C and under a vacuum of $10^{-2}$ mm Hg for 2 hours. Overcoming the above limits by the duration and temperature of the heating as well as by the value of vacuum results in deactivation of the catalyst due to the loss of the second atom of the halide in the active center.

According to the present invention, the method of polymerization and copolymerization of butadiene can be effected in various modifications. The process may be conducted in mass or in a medium of inert hydrocarbon solvents at a temperature of $-25°$ to $+50°C$ in the presence of a catalyst consisting of nickel or cobalt halides applied onto inorganic carriers having electron acceptor properties, said catalyst being activated by heating at $150°-350°C$ and under a vacuum of $10^{-3}$ to $10^{-1}$ mm Hg.

The solvents may be composed of aromatic, aliphatic, alicyclic hydrocarbons such as benzene, toluene, n-heptane, cyclohexane or their mixtures dried above aluminum oxide, molecular sieves or other driers.

In the case of copolymerization, the comonomers of butadiene may be composed of conjugated cyclic dienes having a number of carbon atoms of 5 to 6, for example, cyclohexadiene-1,3 and vinyl aromatic compounds such as styrene, p-chlorostyrene, vinyltoluene, etc.

The halides of nickel and cobalt may be composed of nickel fluoride, nickel chloride, nickel bromide, nickel iodide, cobalt chloride, cobalt bromide; preferably nickel chloride, nickel fluoride, cobalt chloride. The concentration of the catalyst in the reaction system is equal to 0.1-10 percent of the monomer weight.

The inorganic carriers may be composed of aluminum oxide various grades of silica gel, or natural and artificial alumino-silicates, the latter being most preferable.

The isolation of the polymer or copolymer from the polymerization mixture and their further treatment is effected by conventional methods.

In this case the obtained polybutadiene comprises 95-98 percent of 1,4-cis-links, has a molecular weight of 100,000 to 400,000 and for practical purpose does not contain gel.

The copolymers of butadiene obtained under the same conditions with a number of hydrocarbon atoms from five to six, for example, cyclohexadiene-1,3, and with vinyl-aromatic compounds, for example styrene, are random copolymers having a high content of 1,4-cis-links in the butadiene portion of the chain. The copolymers of butadiene with cyclohexadiene-1,3 have a high molecular weight (intrinsic viscosity is equal to 2-2.3 dl/g) and this is a very valuable feature for producing rubber having high physical and mechanical characteristics. The intrinsic viscosity of the polymers and copolymers was determined in toluene at a temperature of 30°C.

The catalyst used in the proposed method is prepared as follows: Aluminosilicate or another carrier is ground and a fraction of particles sized below 0.1 mm is separated. The halide of nickel or cobalt is applied onto the carrier by impregnation or precipitation of this halide from a 2-5 percent aqueous solution in such an amount that its content in the catalyst is equal to 0.01 to 0.2 g per gram of the carrier. The obtained catalyst is dried at $100°-150°C$ and under a vacuum of $10^{-1}$ to $10^{-2}$ mm Hg up to complete removal of the solvent. The dried catalyst is subjected to thermal activation at a temperature of $150°-350°C$ and under a vacuum of $10^{-3}$ to $10^{-1}$ mm Hg. If necessary, both the dried and activated catalyst can be kept in an atmosphere of dry purified argon or nitrogen. All operations with the ready catalyst are carried out under conditions precluding its contact with moisture and air.

The invention will be better understood from the following examples of producing 1,4-cis-polybutadiene and ciscopolymers of butadiene with conjugated cyclic dienes and vinyl-aromatic compounds.

Example 1

Charged into a trained glass ampoule is 0.33 g of a catalyst in the form of nickel chloride on silica gel (the concentration of the nickel chloride is 0.019 g per gram of the carrier). The catalyst is activated in the ampoule at 250°C and under a vacuum of $10^{-2}$ mm Hg for 2 hours. Then the ampoule is cooled and the vacuum is released with dry argon. Loaded into the ampoule is 5 ml of dry cyclohexane and 5 ml (68 mmoles) of butadiene is condensated therein. The sealed ampoule is held in a thermostat at 50°C and is stirred for 5.5 hours. The yield of the polymer, 14.5 percent. The polymer has a molecular weight of 166,000 and contains 95 percent of 1,4-cis-links.

Example 2

The catalyst in the form of nickel fluoride on silica gel (the concentration of the nickel fluoride is 0.026 g per gram of the carrier) in an amount of 2.13 g is activated at 300°C. and under a vacuum of $10^{-2}$ mm Hg for 2 hours. The polymerization of the butadiene (68 mmoles) in mass at 50°C is effected on the catalyst for 5.5 hours. The polymer yield is 97 percent, the molecular weight is 167,000, the content of 1,4-cis-links is 96 percent.

Example 3

0.4 g of a catalyst in the form of nickel fluoride on chromatographic aluminum oxide (the concentration of the nickel fluoride is equal to 0.03 g per gram of the carrier) is activated for 1.5 hour at 350°C and a vacuum of $10^{-3}$ mm Hg. The butadiene (68 mmoles) is polymerized on this catalyst in 5 ml of benzene. The yield of the polymer for 10 hours at 50°C is 22 percent. The molecular weight of the polymer is 145,000, the content of 1,4-cis-links is 96 percent.

Example 4

0.025 g of a catalyst in the form of nickel chloride on aluminoscilicate (the concentration of the nickel chloride is 0.02 g per gram of the carrier) is activated for 2 hours at a temperature of 250°C and under a vacuum of $10^{-2}$ mm Hg. The polymerization of the butadiene (68 mmoles) in 5 ml of toluene is effected on this catalyst. The polymer yield for 1.5 hour at 50°C is 36 percent. The polymer has a molecular weight of 300,000 and a content of 1,4-cis-links of 95 percent.

Example 5

0.135 g of a catalyst in the form of nickel fluoride on aluminosilicate (the content of the nickel fluoride is 0.04 g per gram of the carrier) is activated at a temperature of 280°C and under a vacuum of $10^{-3}$ mm Hg for 2.5 hours. The polymerization of the butadiene (68 mmoles) in 5 ml of toluene for 5 hours at a temperature of 40°C results in obtaining a polymer with a yield of 96 percent. The polymer has a molecular weight of 186,000, an iodine number of 470 and contains 97 percent of 1,4-cis-links.

Example 6

0.124 g of the same catalyst as in Example 5 is activated at 300°C and under a vacuum of $10^{-2}$ mm Hg for 2 hours. The polymerization of the butadiene (68 mmoles) in 16 ml of benzene at 20°C for 7 hours results in a polymer yield of 76.5 percent. The polymer has a molecular weight of 363,000.

Example 7

0.15 g of a catalyst in the form of nickel chloride on aluminosilicate (the concentration of the nickel chloride is 0.2 g per gram of carrier) is activated at 250°C and under a vacuum of $10^{-2}$ mm Hg for 2 hours. The polymerization of the butadiene (68 mmoles) is effected in 5 ml of toluene. The polymer yield for 60 hours at −25°C is 11 percent. The polymer has a molecular weight of 410,000.

Example 8

0.1 g of the same catalyst as in Example 7 is activated under the same conditions. The polymerization of the butadiene (68 mmoles) in 10 ml of n-heptane is effected on the above-said catalyst. The yield of the butadiene for 2 hours at 50°C is 30 percent. The polymer has a molecular weight of 150,000.

Example 9

0.236 g of a catalyst in the form of cobalt chloride on aluminosilicate (the concentration of the cobalt chloride is equal to 0.023 g per gram of carrier) is activated at 280°C under a vacuum of $10^{-2}$ mm Hg for 2.5 hours. The polymerization of the butadiene (8 mmoles) is effected on this catalyst for 2.5 hours at a temperature of 280°C and under a vacuum of $10^{-2}$ mm Hg. The polymerization of the butadiene (68 mmoles) in 5 ml of benzene is effected on this catalyst. The yield of polymer for 22 hours at 40°C is 25 percent. The polymer contains 72.5 percent of 1,4-cis-links, 7 percent of 1,4-trans-links and 20.5 percent of 1,2 links.

Example 10

0.11 g of a catalyst in the form of nickel fluoride on aluminosilicate (the concentration of the nickel fluoride is 0.09 g per gram of the carrier) is activated at 300°C and under a vacuum of $10^{-2}$ mm Hg for 2 hours. Effected on this catalyst is copolymerization of the butadiene (70.7 mmoles) with the cyclohexadiene-1,3 (7.85 mmoles) in benzene (total concentration of the monomers is 5 mole(liter) at 20°C for 18 hours. The yield of copolymer is 23 percent. In this case the copolymer has an intrinsic viscosity in toluene at 30°C of 2.0 dl/g and a temperature of vitrification of −96°C. The vitrification temperature of the copolymers was determined by means of a Marey instrument using the known technique. The butadiene portion of the copolymer contains 98 percent of 1,4-cis-, 1 percent of 1,4-trans- and 1 percent of 1,2-links.

Example 11

0.77 g of a catalyst in the form of nickel fluoride on chromatographic aluminum oxide (the concentration of the nickel fluoride is equal to 0.03 g per gram of the carrier) is activated at 300°C and under a vacuum of $10^{-3}$ mm Hg for 1.5 hours. This catalyst is used for copolymerization of the butadiene (67.5 mmole) with cyclohexadiene-1,3 (3.55 mmole) in toluene (the total concentration of the monomers is 5 mole/liter). After 48 hours, at 0°C the yield of copolymers was 10 percent. The copolymer has an intrinsic viscosity of 2.34 dl/g and a vitrification temperature of −101°C. The copolymer contains 96 percent of 1,4-cis links in the butadiene portion.

Example 12

0.38 g of catalyst in the form of cobalt chloride on aluminosilicate (the concentration of the cobalt chloride is equal to 0.023 g per gram of the carrier) is activated at a temperature of 300°C and under a vacuum of $10^{-2}$ mm Hg for 2.5 hours. This catalyst is used for copolymerization of the butadiene (70.7 mmole) with cyclohexadiene-1,3 (7.85 mmole) in a mixture of benzene-hexane (the volume ratio is 9 :1). The total concentration of monomers is equal to 5 mole/liter. At a temperature of 50°C the yield of copolymer was 8.5 percent for 30 hours. The vitrification temperature of the copolymer is equal to −60°C.

Example 13

0.35 g of catalyst in the form of nickel chloride on silica gel (the concentration of the nickel chloride is 0.02 g per gram of the carrier) is activated at a temperature of 250°C and under a vacuum of $10^{-2}$ mm Hg for 2 hours. This catalyst is used for copolymerization of the butadiene (58.8 moles) with cyclohexadiene-1,3 (19.6 mmole) in cyclohexane. The total concentration of the monomers is equal to 3 moles per liter. For 20 hours at a temperature of 25°C the yield of copolymer is 7 percent. The vitrification temperature of the copolymer is −64°C. The structure of the butadiene portion of the chain: 94 percent of 1,4-cis-links, 2.5 percent of 1,4-trans-links, and 3.5 percent of 1,2-links.

Example 14

0.12 g of catalyst in the form of nickel fluoride on aluminosilicate (the concentration of the nickel fluoride is 0.04 g per gram of the carrier) is activated at a temperature of 300°C and under a vacuum of $10^{-3}$ mm Hg for 2 hours. This catalyst is used for copolymerization of the butadiene (68 mmoles) with cyclopentadiene-1,3 (12 mmoles) in benzene (the total concentration of the monomers is 3 moles per liter). For 32 hours at 20°C the yield of copolymers was 8 percent. The vitrification temperature of the obtained copolymer is −65°C.

Example 15

0.3 g of catalyst in the form of nickel chloride on aluminosilicate (the concentration of the nickel chloride is 0.02 g per gram of the carrier) is activated at a temperature of 250°C and under a vacuum of $10^{-3}$ mm Hg for 2 hours. This catalyst is used for copolymerization of the butadiene (68 mmoles) with styrene (68 mmoles) in 10 ml of benzene. For 12 hours at 50°C the yield of copolymer is 17 percent. The obtained copolymer has an intrinsic viscosity of 0.235 dl/l and a content of styrene links, approximately 10 mol percent.

Example 16

0.195 g of catalyst in the form of nickel fluoride on aluminosilicate (the concentration of the nickel fluoride is 0.04 g per gram of the carrier) is activated at a temperature of 300°C and under a vacuum of $10^{-2}$ mm Hg for 2.5 hours. The catalyst is used for copolymerization of the butadiene (68 moles) with styrene (68 mmoles) in 10 ml of benzene. For 10 hours at 50°C the yield of polymer was 20 percent. The intrinsic viscosity is 0.44 dl/g. The copolymer contains approximately 10 mol percent of styrene links.

Example 17

0.26 g of catalyst in the form of nickel chloride on aluminosilicate (the concentration of the nickel chloride is 0.02 g per gram of the carrier) is activated at a temperature of 270°C and under a vacuum of $10^{-2}$ mm Hg for 2 hours. This catalyst is used for copolymerization of the butadiene (34 moles) with parachlorostyrene (34 mmoles) in 10 ml of toluene. For 15 hours the yield of copolymer was 7.4 percent. The copolymer contains approximately 20 ml % of p-chlorostyrene links.

We claim:

1. A method of producing cis-copolymers of butadiene with conjugated cyclic dienes having five to six carbon atoms or with styrene which comprises copolymerizing butadiene with a compound selected from the group consisting of conjugated cyclic dienes having five to six carbon atoms and styrene in the presence of a catalyst consisting of a metal halide selected from the group consisting of nickel and cobalt halides applied onto an inorganic carrier having electron acceptor properties selected from the group consisting of aluminum oxide, silica gel and aluminosilicate, said catalyst being thermally activated at a temperature of 150° to 350°C and under a vacuum of $10^{-3}$ to $10^{-1}$ mm Hg, the concentration of said catalyst in the reaction system being equal to 0.1 to 10 percent of the weight of the monomers.

2. A method as claimed in claim 1, in which said halides are applied onto the carrier in such an amount that the content thereof in the catalyst is equal to 0.01 to 0.2 gram per gram of the carrier.

3. A method as claimed in claim 1, in which the thermal activation of the catalyst is effected at a temperature of 250°–300°C and under a vacuum of $10^{-3}$ to $10^{-1}$ mm Hg.

4. The method of claim 1 which further comprises effecting the copolymerization in a mass.

5. The method of claim 1 which further comprises effecting the copolymerization in the medium of an inert hydrocarbon solvent.

6. A method of producing 1,4-cis-polybutadiene which comprises polymerizing butadiene in the presence of a catalyst consisting of a metal halide selected from the group consisting of nickel and cobalt halides applied onto an inorganic carrier having electron acceptor properties selected from the group consisting of aluminum oxide, silica gel and aluminosilicate, said catalyst being thermally activated at a temperature of 150° to 350°C and under a vacuum of $10^{-3}$ to $10^{-1}$ mm Hg, the concentration of said catalyst in the reaction system being equal to 0.1 to 10 percent of the weight of the butadiene.

7. The method of claim 6 which further comprises effecting the polymerization in a mass.

8. The method of claim 6 which further comprises effecting the polymerization in the medium of an inert hydrocarbon solvent.

* * * * *

UNITED STATES PATENT OFFICE
CERTIFICATE OF CORRECTION

Patent No. 3,723,400     Dated March 27, 1973

Inventor(s) Boris Alexandrovich Dolgoplosk et al.

It is certified that error appears in the above-identified patent and that said Letters Patent are hereby corrected as shown below:

On the Title Page in item 75, "Alexandra Kon" should read -- Alexand a Kon., Lileeva --.

Signed and sealed this 10th day of December 1974.

(SEAL)
Attest:

McCOY M. GIBSON JR.
Attesting Officer

C. MARSHALL DANN
Commissioner of Patents